Oct. 13, 1959 R. J. BRANT 2,908,248
APPARATUS FOR CLEANING AND REPAIRING PIPE LINES
Filed April 25, 1958 2 Sheets-Sheet 1
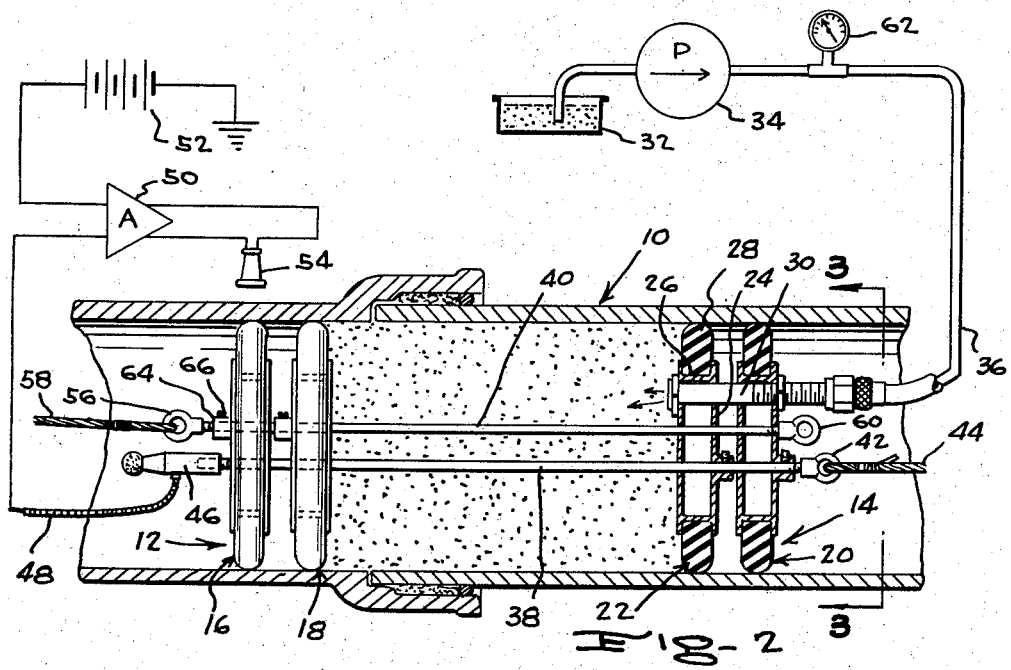
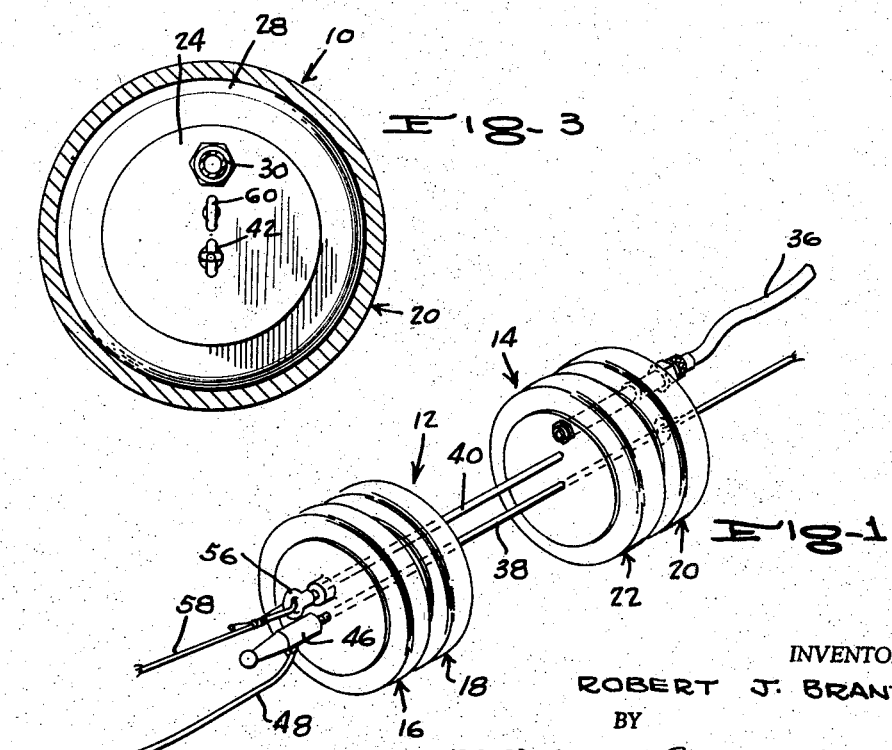
INVENTOR.
ROBERT J. BRANT
BY
McMorrow, Berman & Davidson
ATTORNEYS Oct. 13, 1959 R. J. BRANT 2,908,248
APPARATUS FOR CLEANING AND REPAIRING PIPE LINES
Filed April 25, 1958 2 Sheets-Sheet 2
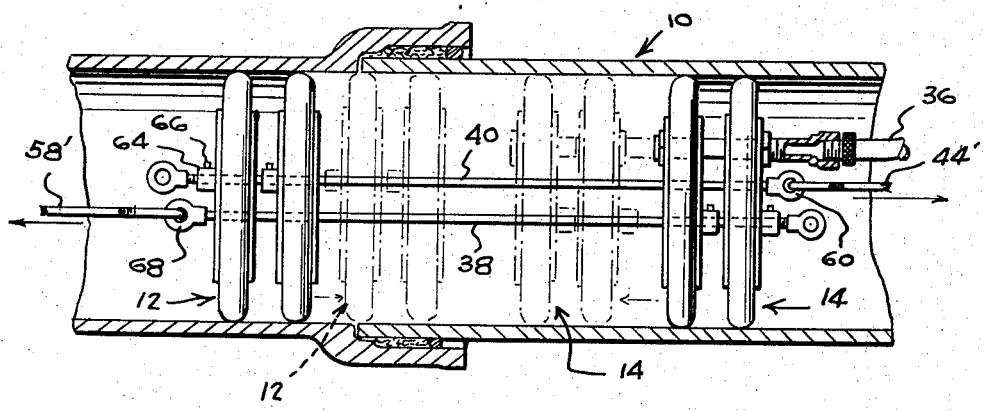
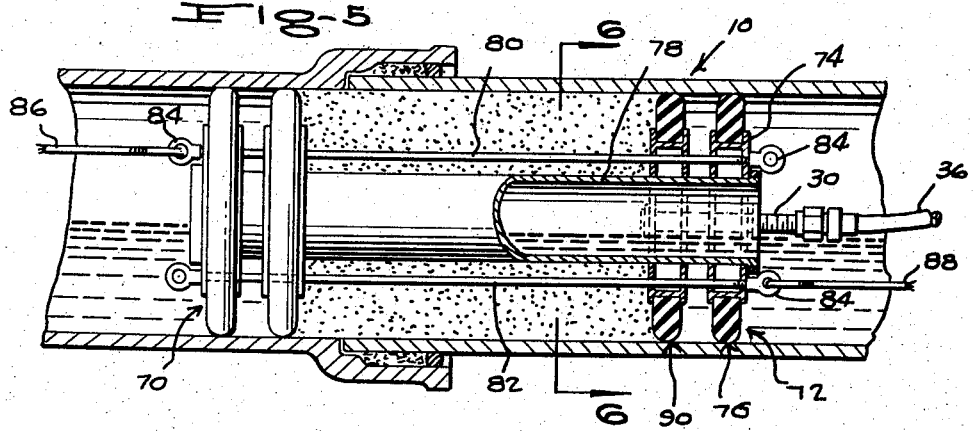
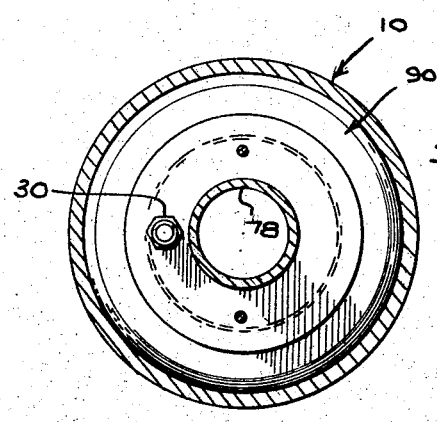
INVENTOR.
ROBERT J. BRANT
BY
McMorrow, Berman & Davidson
ATTORNEYS

United States Patent Office 2,908,248
Patented Oct. 13, 1959

2,908,248

APPARATUS FOR CLEANING AND REPAIRING PIPE LINES

Robert J. Brant, San Rafael, Calif.

Application April 25, 1958, Serial No. 730,921

3 Claims. (Cl. 118—408)

The present invention relates to an apparatus for cleaning and repairing pipe lines which have access openings at spaced intervals therealong.

An object of the present invention is to provide an apparatus for cleaning and repairing pipe lines which lends itself to insertion into a pipe line through an access opening and to pulling by a cable which has been inserted through another access opening into the pipe line, the apparatus while being pulled through the pipe line applying a coating to the pipe wall and filling crevices which may be in the wall.

Another object of the present invention is to provide an apparatus for cleaning and repairing pipe lines which is sturdy in construction, one simple in structure, one economical to manufacture and assemble, and one which is highly effective in action.

These and other objects and advantages of the present invention will be fully apparent from the following description when taken in conjunction with the annexed drawings, in which:

Figure 1 is an isometric view of the apparatus according to the present invention;

Figure 2 is a view in section of a pipe line portion with the apparatus of the present invention installed therein, a portion of the apparatus being shown in section, and a schematic view of a means to supply semisolid fluid material to the apparatus, together with a schematic view of a means for detecting by sound defects in the wall of the pipe;

Figure 3 is a view taken on the line 3—3 of Figure 2;

Figure 4 is a sectional view of a pipe line portion with a modified form of the apparatus of the present invention installed therein;

Figure 5 is a sectional view of a pipe line portion with a still further modified form of the apparatus of the present invention installed therein; and Figure 6 is a view taken on the line 6—6 of Figure 5.

Referring in greater detail to the drawings in which like numerals indicate like parts throughout the several views, a portion of a pipe line is shown in Figure 2 and designated by the reference numeral 10. The apparatus of the present invention is installed within the pipe line portion 10 and comprises two pairs of discs 12 and 14 arranged in a predetermined axial spaced relation and connected together for movement in unison in the axially spaced relation. The pair of discs 12 consists in discs 16 and 18 and the pair of discs 14 consists in discs 20 and 22. The peripheries of the discs 16, 18, 20, and 22 are in wiping contact with the inner wall of the pipe line portion 10.

Each of the discs 16, 18, 20, 22 consists in a hub 24 having a peripheral channel 26 in which is seated a resilient ring 28, as shown in Figure 2 with reference to the disc 22. The discs 18 and 22, together with the portion of the inner wall of the pipe line portion 10 therebetween defines between them a chamber.

A nipple 30 extends through the discs 20 and 22 and is fixedly carried thereby with one end in communication with the interior of such chamber and the other end exteriorly of the chamber. A reservoir 32, shown schematically in Figure 1, is provided and is adapted to contain a supply of fluid coating substance in semi-liquid form. A pump 34 connects the reservoir 32 to the other end of the nipple by means of a flexible conduit 36 for completely filling and maintaining the chamber between the discs 18 and 22 with the fluid substance under pressure.

Rods 38 and 40 extend through the pairs of discs 12 and 14 and has a portion adjacent each end exteriorly of the discs 16 and 20, respectively. The portion of the rod 38 exteriorly of the disc 20 is provided with an eye formation 42 for attachment thereto of one end of a cable 44. A microphone 46 is carried on the other end portion of the rod 38 exteriorly of the disc 16 and is connected by an electric cable 48 to an amplifier unit 50 which is in circuit with a source of current such as a battery 52 and a translating device or speaker 54.

The portion of the rod 40 exteriorly of the disc 16 is provided with another eye formation 56 for attachment thereto on one end of another cable 58. Another eye formation 60 is carried on the portion of the rod 40 exteriorly of the disc 20.

A pressure gauge 62 is interposed in the conduit 36 between the nipple 30 and the pump 34.

The hub 24 of each of the discs 16, 18, 20, and 22 is provided with a projecting boss receiving a set screw as in Figure 2 with reference to the disc 16, the boss being designated by the reference numeral 64 and the set screw by the reference numeral 66. The respective bosses and set screws for each disc comprise the means by which the discs 16 and 18 are fixedly secured to the one rod 40 and the discs 20 and 22 are secured to the other rod 38.

In Figure 4, a modified form of the apparatus of the present invention is shown in which all of the components are identical with the components heretofore described with reference to the embodiments shown in Figures 1 to 3. The exception is that the cable 44' is secured to the eye formation 60 on the projecting end portion of the rod 40 and the cable 58' is secured to an eye formation 68 carried on the projecting end portion of the rod 38. The conduit 36 is connected to the same source of coating substance under pressure as heretofore described. Each of the discs of the pair of discs 12 is connected to the rod 40 and each of the discs of the pair of discs 14 is connected to the rod 38.

In Figures 5 and 6, a still further modified form of the invention is shown in which a pair of discs 70 are arranged in aligned spaced relation with respect to another pair of discs 72 within the pipe line portion 10. Each disc of each pair of discs 70 and 72 is provided with a hub 74 as shown with reference to the disc 76 of the pair of discs 72. Each hub 74 is provided with a central opening through which extends an open-ended conduit 78 having the open ends thereof in communication with the interior of the pipe line portion 10 exteriorly of the chamber defined by the inner disc of each of the pair of discs 70 and 72. A pair of rods 80 and 82 extend through the pairs of discs 70 and 72 and each has an eye formation 84 on each end thereof for attachment of cables 86 and 88, the cable 86 being attached to the eye formation on one end of the rod 80 and the cable 88 being attached to the eye formation on the end of the rod 82 opposite to the attachment of the cable 86.

The same nipple 30 extends through the discs 76 and 90 of the pair of discs and has one end connected in communication with the chamber defined by the inner discs of the pairs of discs 70 and 72, the inner wall of the adjacent portion of the pipe line portion 10 and the exterior wall of the conduit 78. The same conduit 36 connects the nipple 30 to the pump or other source of fluid coating substance.

The pairs of discs 70 and 72 are fixedly secured to the conduit 78 for movement together in unison.

In operation, one or the other of the cables 44 and 50, 44' and 58', and 86 or 88, is secured to a source of pulling power such as a winch and the associated pairs of discs are moved in unison in an axial spaced relation through the pipe line portion 10 with the peripheries of the discs of each pair of discs in wiping contact with the interior wall of the portion 10. Material for coating the inner wall of the pipe portion 10 and sealing any crevice therein is pumped through the conduit 36 under pressure. In the form of the invention shown in Figure 2, the microphone 46 picks up any sound of rushing fluid escaping through a leak and informs the operator when the apparatus of the present invention is adjacent to such leak. When the leak in the pipe line is encountered by the apparatus, a drop in pressure will show on the gauge 62 until the cementing substance pumped into the chamber between the pairs of discs completely plugs up such leaks at which time the gauge will return to its predetermined pressure and the pairs of discs may be moved as a unit further along the pipe line depositing on the inner wall thereof the coating as desired and filling other crevices or leaks with the sealing compound.

Means is provided for varying the axial relation of the discs in the pairs of discs. This means is inherent in the modified form of the apparatus shown in Figure 4. Upon a greater pulling force to the cable 44' than to the balancing pulling force to the cable 58', the pairs of discs 12 and 14 will be caused to move from their full line position to the dotted line positions closer to each other than formerly. This exerts a greater pressure upon the substance contained in the chamber defined by the inner discs of the pairs of discs and the adjacent portion of the pipe line wall.

What is claimed is:

1. Apparatus for cleaning and repairing a pipe line comprising at least two pairs of discs arranged in a predetermined axial spaced relation and connected together for movement in unison in the axially spaced relation adapted for peripheral wiping contact with an inner wall of a pipe line, means for varying the axial relation of said discs, said discs when in peripheral contact with said pipe line wall defining between them a chamber, a nipple extending transversely through and fixedly carried by one of said discs and having one end in communication with the interior of said chamber and having the other end exteriorly of said chamber, a reservoir adapted to contain a supply of fluid coating substance, and pump means connecting said reservoir to the other end of said nipple for completely filling and maintaining said chamber with said substance under pressure to plug up any crevice in and coat the pipe line wall defined by said chamber.

2. Apparatus for cleaning and repairing a pipe line comprising at least two pairs of discs arranged in a predetermined axial spaced relation and connected together for movement in unison in the axially spaced relation adapted for peripheral wiping contact with an inner wall of a pipe line, means for varying the axial relation of said discs, said discs when in peripheral contact with said pipe line wall defining between them a chamber, a nipple extending transversely through and fixedly carried by one of said discs and having one end in communication with the interior of said chamber and having the other end exteriorly of said chamber, a reservoir adapted to contain a supply of fluid coating substance, pump means connecting said reservoir to the other end of said nipple for completely filling and maintaining said chamber with said substance under pressure to plug up any crevice in and coat the pipe line wall defined by said chamber, and a pulling cable on one of said discs for drawing said discs in the axially spaced relation while the chamber is being maintained under pressure along said pipe line to effect coating of the pipe wall with said substance.

3. Apparatus for cleaning and repairing a pipe line comprising at least two pairs of discs arranged in a predetermined axial spaced relation and connected together for movement in unison in the axially spaced relation adapted for peripheral wiping contact with an inner wall of a pipe line, said discs when in peripheral contact with said pipe line wall defining between them a chamber, an open ended conduit extending from one of said discs to the other of said discs and having the open ends in communication with the interior of said pipe line exteriorly of said chamber for permitting flow of fluid through said pipe line from one side to the other side of said chamber, a nipple extending transversely through and fixedly carried by one of said discs and having one end in communication with the interior of said chamber and having the other end exteriorly of said chamber, a reservoir adapted to contain a supply of fluid coating substance, and pump means connecting said reservoir to the other end of said nipple for completely filling and maintaining said chamber with said substance under pressure to plug up any crevice in and coat the pipe line wall defined by said chamber.

References Cited in the file of this patent

UNITED STATES PATENTS

| 907,724 | Boyle | Dec. 29, 1908 |
| 1,746,071 | Cotton | Feb. 4, 1930 |
| 2,108,319 | Perkins | Feb. 15, 1938 |
| 2,808,852 | Brant | Oct. 8, 1957 |
| 2,851,061 | Bernard et al. | Sept. 9, 1958 |

FOREIGN PATENTS

| 6,507 | Great Britain | Mar. 17, 1904 |
| 646,400 | Great Britain | Nov. 22, 1950 |